United States Patent [19]

Masniere et al.

[11] Patent Number: 4,665,743
[45] Date of Patent: May 19, 1987

[54] AUTOMATIC RAIN GAUGE

[75] Inventors: Pierre Masniere, Bois Colombes; André Ducourroy, Croissy sur Seine, both of France

[73] Assignee: Electricite de France Service National, Paris, France

[21] Appl. No.: 810,706

[22] Filed: Dec. 19, 1985

[30] Foreign Application Priority Data

Dec. 21, 1984 [FR] France .................................. 84 19698

[51] Int. Cl.$^4$ ............................................ G01W 1/14
[52] U.S. Cl. .................................. 73/170 R; 73/171; 73/863.31
[58] Field of Search ................ 73/170 R, 171, 863.01, 73/863.02, 863.11, 863.31

[56] References Cited

U.S. PATENT DOCUMENTS 3,296,858  1/1967  Doury et al. .................... 73/170 R
3,598,161  8/1971  Baldwin .
4,140,011  2/1979  Krupa et al. .
4,335,620  6/1982  Adams .

FOREIGN PATENT DOCUMENTS 1573372  9/1970  Fed. Rep. of Germany .
0637694  12/1978  U.S.S.R. ......................... 73/170 R

OTHER PUBLICATIONS

Review of Scientific Instruments, vol. 45, No. 12, Dec. 1974, pp. 1517–1519.
W. A. H. Asman–"Draft, Construction and Operation of a Sequential Rain Sampler", Water, Air & Soil Pollution 13, No. 2, 6/1980, pp. 235–245.
G. S. Raynor et al., "An Automatic Sequential Precipitation Sampler", Atmospheric Environment, vol. 13, No. 1, 1979, pp. 149–155.

Primary Examiner—Charles A. Ruehl

[57] ABSTRACT

An automatic rain gauge or pluviometer comprising a first receiver for receiving dry fallout; a second receiver for receiving wet fallout, provided with a first sensor able to emit a signal when a certain wet fallout sample volume has been collected; a closing device permitting the alternating closure of the two receivers as a function of a signal emitted by a precipitation detector; a measuring device located at the outlet of the second receiver and used for carrying out measurements of physicochemical quantities on the sample; a sampling device located at an outlet of the measuring device and used for arranging and keeping at a temperature below 0° C. a fraction of each sample collected; and a checking system used for automatically controlling the aforementioned components as a function of the signals emitted by the sensors, including the first sensor and the precipitation detector and for managing the measurements performed on the sample.

10 Claims, 1 Drawing Figure

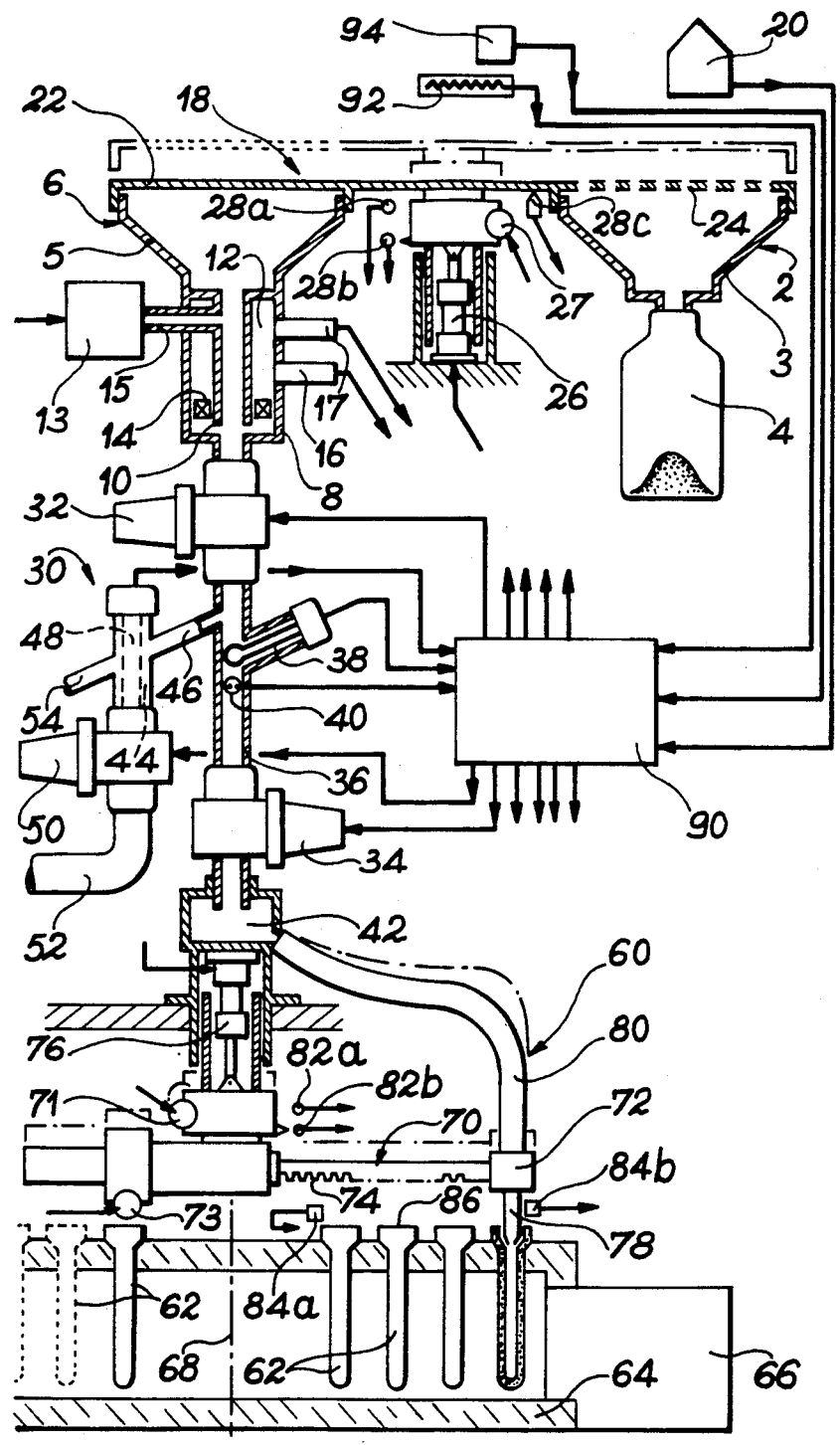

AUTOMATIC RAIN GAUGE

BACKGROUND OF THE INVENTION

The present invention relates to an automatic rain gauge or pluviometer. It is more particularly intended for physicochemical measurements and for keeping moist fallout samples. Its design takes account of the experimental constraints which occur at an isolated site (remote from analytical laboratories, episodic monitoring of the operation of the apparatus, etc).

It is now necessary to carry out detailed study of the chemistry of atmospheric precipitation and more particularly the problem of acid rain. Attempts are being made to follow the development of various parameters such as pH, conductivity, temperature, contents of various chemical species during precipitation and to link the results obtained with different types of meteorological situation, but also the evolution of gas and particle contents in the atmosphere and the transportation over long distances of certain atmospheric pollutants.

Thus, such research requires an automatic rain gauge able to carry out physicochemical measurements on a large number of successive rain sequences and to maintain at a temperature below 0° C. for a relatively long period (several weeks) samples of wet fallout with a given volume for subsequent chemical analysis. Moreover, it is necessary that the measurements e.g. performed during the measurement of the pH values do not affect the chemical composition of the samples which are to be kept. The rain gauge must also be able to separate wet and dry fallouts.

SUMMARY OF THE INVENTION

The present invention relates to an automatic rain gauge meeting the aforementioned requirements. More specifically, the invention relates to an automatic rain gauge comprising a first receiver for receiving dry fallout, a second receiver for receiving wet fallout and provided with a first sensor able to emit a single when a wet fallout sample of a given volume is collected, said second receiver being equipable with a heating system, a closing device making it possible to alternately close the two receivers as a function of a signal emitted by a precipitation detector, a measuring device located at the outlet of the second receiver and which carries out measurements of physicochemical quantities on the sample, a sampling device located at an outlet of the measuring device and used for placing and keeping a fraction of each sample collected at a temperature below 0° C. and a checking system for automatically controlling the aforementioned components as a function of signals emitted by sensors including said first sensor and the precipitation detector and for managing the measurements performed on the sample by dating them.

According to a preferred embodiment of the invention the measuring device comprises an intake valve located at the outlet of the second receiver, a main outlet valve communicating with the intake valve by means of a main tube provided with a temperature measuring probe and a conductivity measuring probe, said main outlet valve being connected to the sampling device, a secondary outlet valve communicating with the main tube by a secondary tube provided with an overflow and connected to the main tube above said probes, said secondary outlet valve being connected to a discharge duct, whilst the secondary tube is provided with a pH-meter.

Advantageously the sampling device comprises a vessel in which are arranged test tube for receiving the samples and a distributing mechanism making it possible to successively move above each test tube an injection head communicating with the measuring device and used for injecting a sample into each test tube by means of a pouring spout.

Advantageously the test tubes are provided with a closure constituted by a cross-slit polytetrafluoroethylene sheet permitting the penetration of the pouring spout and the vessel of the sampling device is provided with a cooling system making it possible to obtain temperatures below 0° C.

Advantageously, a rising device is placed in the second receiver and incorporates means for filling same with a rising liquid, a second sensor emitting a signal when a certain rinsing liquid volume has filled the second receiver.

According to a preferred embodiment, the complete circuit taken by the wet fallout samples is covered with polytetrafluoroethylene.

BRIEF DESCRIPTION OF THE DRAWING

The invention is described in greater detail hereinafter relative to non-limitative embodiments and with reference to the attached drawing, which shows an overall diagram of a preferred embodiment of the invention.

DETAILED DESCRIPTION OF THE INVENTION

The automatic rain gauge for pluviometer according to the invention shown in the drawing comprises four main parts:
 a device 2, 6, 18 for removing samples of wet and dry fallouts;
 a device 30 for measuring physicochemical quantities on each sample, in this case, the temperature, conductivity and pH; a sampling device 60 making it possible to arrange, grade and retain a fraction of each sample collected for subsequent chemical analyses; a checking system 90 permitting the automation of the removal, measurement and sampling procedure.

The device for removing samples firstly comprises a first receiver 2 for collecting dry fallout. Receiver 2 has a receiving cone or funnel 3, whose bottom, which has a device which holds back foreign bodies (insects, large particles, etc), communicates with a container 4. The dry fallout collected by receiver 2 accumulates in container 4 for subsequent analysis.

The device for removing samples also comprises a second receiver 6 for collecting wet fallout. Said receiver 6 has a receiving cone or funnel 5, whose bottom, provided with a device holding back foreign bodies, communicates with a container 8 via a central tube 10. Container 8 has an annular tank 12 communicating with the central tube 10 and an annular float 14 sliding in said tank 12. A first proximity detector or sensor 16 is placed at a certain height from tank 12.

When the receiving cone 5 receives wet fallout, the latter drops in central tube 10 and starts to fill vessel 12, float 14 consequently rising in said tank 12 up to the time when a certain desired wet fallout volume has been collected corresponding to the position of float 14 facing sensor 16. Sensor 16 then emits a signal corresponding to the end of the removal of a certain volume of wet fallout, e.g. 40 ml.

The second receiver 6 also has a rinsing device 13 having means, e.g. a rinsing liquid reservoir and a pump, which make it possible to fill the annular tank 12 by a tube 15 connected to central tube 10. A second proximity detector or sensor 17 positioned above the first sensor 16 emits a signal when a certain rinsing liquid volume (e.g. double the sample volume, i.e. 80 ml) has filled tank 12 and has consequently brought float 14 to the height of said sensor 17.

A closing device 18 makes it possible to alternately close one of the two receivers 2 and 6 as a function of a signal emitted by a precipitation detector 20. The closing device 18 has a cover 22 fitted to the inlets of the two receivers 2, 6 and rotating about a vertical axis mid-way between the two receivers. By rotating by 180°, the cover can have two positions.

In the first position (continuous line in the drawing), the inlet of the second receiver 6 is closed, whereas the inlet of the first receiver 2 communicates with the exterior via an opening 24. In the second position (mixed line in the drawing), the inlet of the first receiver 2 is closed, whereas the inlet of the second receiver 6 communicates with the exterior.

A jack 26 ensures the raising of cover 22 and its rotation is actuated by a motor 27, thus permitting an alternating closure of one or other receiver. Thus, either dry fallout is collected in first receiver 2, or wet fallout in second receiver 6. Position detectors 28a, 28b, 28c emit signals corresponding to the positions successively occupied by cover 22.

A measuring device 30 is located at the outlet of the second receiver 6. It firstly has an intake valve 32 positioned at the outlet of the second receiver 6 and a main outlet valve 34 located below said intake valve 32 and communicating with the latter via a vertical main tube 36. Tube 36 is provided with a temperature measuring probe or sensor 38 and a conductivity measuring probe or sensor 40 positioned at a certain height from said main tube 36. The main outlet valve 34 is connected to an inlet chamber 42 of the sampling device 60 to be described hereinafter.

A second vertical tube 44 communicates with the main tube 36 by a sloping duct 46 attached to the main tube 36 above said probes 38, 40. The duct 46 acts as an overflow for the main tube 36, thus permitting a fraction of the sample to fill the secondary tube 44 provided with a pH-meter 48. A secondary outlet valve 50 is placed at the lower outlet of the secondary tube 44 and connects the latter to a discharge duct 52. A discharge pipe 54 is attached at a certain height to secondary tube 44, thus acting as an overflow for the latter.

Thus, this arrangement makes it possible to split up into two portions the wet fallout sample collected. The first portion (representing e.g. three-fourths of the sample) fills the main tube 36 up to the level of duct 46 and is subject to temperature and conductivity measurements by probes 38 and 40. These measurements do not affect the chemical composition of the wet fallout and said portion of the sample is consequently to be retained in sampling device 60. The second portion (representing e.g. a fourth of the sample) fills the secondary tube up to the level of discharge pipe 54 and is subject to pH-measurement by pH-meter 48. This measurement can affect the chemical composition of the wet fallout and for this reason said second sample portion is discarded to the outside through discharge duct 52. It is pointed out that the pH-meter must be kept constantly wetted.

Sampling device 60 is positioned at the outlet of the main outlet valve 34 via an inlet chamber 42. It is used for arranging, grading and retaining the sample fractions which are to be subsequently analysed in test tubes 62 positioned in a vessel 64 maintained at a given temperature, e.g. below 0° C., by a cooling system 66. According to the preferred embodiment of the invention shown in the drawing, the vessel 64 is cylindrical and has a central vertical axis 68. The test tube 62 are regularly arranged in accordance with circles concentric to said axis 68.

A distributing mechanism is positioned above vessel 64 and has an arm 70, which can rotate about axis 68 due to a motor 71 enabling an injection head 72 to move above the test tube 62 located on the same circle. A motor 73 operates a not shown pinion, which meshes with a rack 74 formed on arm 70, thus permitting the radial translation of the latter, so that injection head 72 moves above the test tubes 62 of one circle to the test tube 62 of another circle. The distributing mechanism also has a jack 76 ensuring the vertical translation of the arm 70.

Injection head 72 communicates with the inlet chamber 42 of the sampling device 60 and consequently with the main intake valve 34 by means of a flexible hose 80. Injection head 72 is provided with a tapered pouring spout 78 penetrating the test tubes when jack 76 moves arm 70 downwards. Thus, the first portion of the sample passing through the main tube 36 flows via the flexible hose 80 towards the injection head 72 and then via the pouring spout 78 into the test tube 62 positioned below said injection head.

Position detectors 82a, 82b, 84a, 84b emit signals during the vertical and radial translations of arm 70. They are only shown for information purposes and there number is not limited. For example, the rotation position detectors for arm 70 are not shown.

Thus, the sampling device makes it possible to fill the test tubes with a portion of the wet fallout sample collected. A checking system 90 described hereinafter makes it possible to actuate the distributing mechanism in order to fill the test tubes and grade them in chronological order. The number of test tubes varies and is e.g. approximately 25. In accordance with the wet fallout sampling rate, there is an autonomy of several weeks during which the samples are removed, analyzed and then kept for more detailed subsequent chemical analyses. The number of test tubes is based on the intended meteorological studies and the climates examined. The test tube arrangement described has only been given as an example.

Advantageously, the test tubes 62 are provided in each case with a closure 86 constituted by a sheet, e.g. of polytetrafluoroethylene and which is slit in cross-like manner. When the injection head 72 moves downwards, its pouring spout 78 opens said sheet permitting the injection of the sample into the corresponding test tube 62. When the inject head 72 rises again, the sheet closes, thus effectively sealing the test tubes. The keeping stability of the samples is consequently ensured.

According to the preferred embodiment of the automatic rain gauge, the circuit taken by the wet fallout samples is covered by polytetrafluoroethylene. Only test tubes 62 are e.g. glass tubes for better keeping the samples prior to chemcal analysis.

The automatic rain gauge according to the invention also has a checking or control system 90 for controlling all the devices described hereinbefore. It e.g. comprises a programmable automaton which receives signals from different sensors and controls the valves, jacks and other actuating devices. In the embodiment shown, checking system 90 receives signals from precipitation detector 20, first sensor 16, second sensor 17, all the position sensors 28a, 28b, 28c, 82a, 82b, 84a, 84b and not shown sensors and whose number is not limited. It actuates the closing device 18 by means of jack 26 and motor 27, the three valves 32, 34 and 50, the distributing mechanism by motor 71, 73 and jack 76 and the rinsing device pump 13. In the same way, the number of actuated components is not limitative.

The checking system 90 e.g. comprises a clock and a data acquisition system (printer, magnetic support) suitable for teletransmission. Information such as the date, time, temperature, conductivity and pH measurements given by sensors 38, 40 and 48 respectively the external temperature and the atmospheric pressure given by sensors 92 and 94 are recorded for each sample, certain measurements such as the temperature, conductivity and pH being performable several times for each of the samples. It is also possible to note the position of the test tubes in the vessel corresponding to the samples. The number of informations recorded or transmitted is obviously not limited. Bearing in mind the operating sequences to be automated, the design of such a checking or control system 90 falls within the routine activity of the Expert.

The first and second receivers 2, 6 can have cones with different cross-sections (e.g. 0.039 or 0.38 m$^2$). For an identical volume removed, the removal times vary as a function of the inlet cross-section of the receivers. This also applies to the precipitation detector 20. The sensitivity scale of the latter can be controlled by the bias or slope of a variable heating system, according to the choice of precipitation retained (slight precipitation can be taken into account), two sections of 12 and 100 cm$^2$ being envisaged.

A description will now be given of the operating procedure of the automatic rain gauge according to the invention, whereof a preferred embodiment has been described with reference to the drawing.

The operating procedure firstly comprises a first sequence taking place in the following way. The injection head 72 moves and is positioned in a raised position above the empty test tube 62. The closing device 16 closes the second receiver 6, whilst the first receiver 2 is open. When there is an adequate wet fallout quantity, the precipitation detector 20 emits a signal. Control or checking system 90 then controls the closing device 18, so that the second receiver 6 is opened. The wet fallout accumulates in tank 12 passing through central tube 10 until the first sensor 16 emits a signal corresponding to a particular collected volume of e.g. 40 ml. At the time when the first sensor 16 emits its signal, the secondary outlet valve 50 is operated in the opening sense for two seconds discharging the liquid contained in the secondary tube 44 by discharge duct 52. After these two seconds, the intake valve 32 is operated in the opening sense for a time adequate for the outflow of the sample (e.g. four seconds), after which it is closed again. The 40 ml of the sample are subdivided into two portions by the overflow 46. 30 ml fill the main tube 36 in which the temperature and conductivity measurements are performed and 10 ml fill the secondary tube 44 where the pH measurements are performed. The pH-meter 48 is therefore constantly wetted. For e.g. thirty seconds, five series of measurements are performed and recorded by checking system 90, which prints these informations on paper or transmits them with the date, time, external temperature, atmospheric pressure and other useful details. The distributing mechanism is operated in such a way that arm 70 moves downwards. The pouring spout 78 is then immersed in test tube 62 below it through closure 86. The main outlet valve 34 is operated in the opening sense for three seconds. The 30 ml flow through inlet 42, hose 80, injection head 72 and pouring spout 78 into the coresponding test tube 62.

The following sequences up to the penultimate sequence take place in the following way. With the previous test tube 62 filled, the distributing mechanism moves the injection head 72 above a new empty test tube 62. When the first sensor 16 emits its signal corresponding to 40 ml of collected wet fallout, the procedure takes place during the first sequence.

These successive sequences take place until the precipitation detector no longer receives sufficient wet fallout and emits no signals for e.g. 3 minutes. The closing device 18 is controlled in such a way that the second receiver 6 is closed and the first receiver 2 open. The volume present at this instant is discharged into the measuring device by the opening of the intake valve 32. Series of measurements are performed, but are not always significant, the collected volume being variable. The volume is then discharged into a corresponding test tube 62 through the opening of the main outlet valve 34 and following the circuit of the sampling device.

The rinsing sequence is then collected by checking system 90 and takes place as follows. The injection head 72 is positioned above a new empty test tube. Deionized water is passed by the rinsing device 13 into central tube 10, in order to fill tank 12 of second receiver 6. Rinsing device 13 stops its action when the second sensor 17 emits a signal corresponding to an accumulated water volume of approximately 80 ml. The secondary outlet valve 50 is operated in the opening sense for two seconds discharging the liquid contained in the secondary tube 44 by the discharge duct 52. At this instant, intake valve 32 is operated in the opening sense. Deionized water fills the main tube 36 up to the level of overflow 46 and then fills the secondary tube 44 up to the level of the overflow 54. Thus, the pH-meter is constantly wetted. The remainder of the deionized water is discharged by discharge tube 54. The rain gauge is then ready for a new sequence controlled by the signal emitted by precipitation detector 20. The main outlet valve 34 is then operated in the opening sense to discharge the rinsing liquid contained in the main tube 36 by the circuit of sampling device 60 up to a corresponding test tube 62.

Thus, on each rinsing of the circuit, a test tube 62 is consequently filled with rinsing liquid and is consequently not used for a subsequent chemical analysis.

It can be envisaged that on each rinsing sequence, the sampling mechanism moves the injection head 72 above a discharge duct where the rinsing liquid is discharged during the first sequence. The injection head 72 is then placed above a corresponding empty test tube 62. This makes it possible to use the test tubes solely for wet fallout samples.

What is claimed is:

1. An automatic rain gauge comprising a receiver for receiving wet fallout and sampling means connected to said receiver in order to fill successively a plurality of test tubes with a given quantity of said wet fallout, with a view to further chemical analysis, wherein said rain gauge further comprises measuring means for performing measurements of physicochemical parameters on said wet fallout, said measuring means being located between the receiver and the sampling means and comprising means for dividing the wet fallout in two parts, means for performing at least one physicochemical measurement which does not affect the chemical composition of the wet fallout on a first of said parts, and means for performing at least one physicochemical measurement which can affect the chemical composition of the wet fallout on the second of said parts, only the first part of the wet fallout being supplied to said sampling means.

2. An automatic rain gauge according to claim 1, wherein said means for performing at least one physicochemical measurement on the first part of the wet fallout are located in a vertical main tube connecting the receiver to the sampling means, said means for performing at least one physicochemical measurement on the second part of the wet fallout being located in a vertical secondary tube connected to the main tube by an overflow duct forming said means for dividing the wet fallout in two parts.

3. An automatic rain gauge according to claim 1, wherein said rain gauge further comprises a receiver for receiving dry fallout, a precipitation detector, and means for alternately closing each said receivers as a function of a signal emitted by said detector.

4. An automatic rain gauge according to claim 1, wherein the sampling means comprise a vessel in which said test tubes are arranged in accordance with circles concentric to a vertical axis, said vessel including means for keeping said test tubes at a given temperature, a flexible hose connecting said measuring means to an injection head, a telescopic arm carrying said injection head, and means for controlling a length variation of said arm and a rotation of said arm around said vertical axis, in order to bring the injection head successively above each test tube.

5. An automatic rain gauge according to claim 1, wherein said rain gauge further comprises two valves respectively located between the receiver for receiving wet fallout and the measuring means and between these measuring means and the sampling means.

6. An automatic rain gauge according to claim 1, wherein the receiver for receiving wet fallout comprises means for detecting the presence of a given volume of said wet fallout.

7. An automatic rain gauge according to claim 1, wherein the receiver for receiving wet fallout is provided with a rinsing device having means for filling said receiver with rinsing liquid, and means for detecting the presence of a given volume of said rinsing liquid in said receiver for receiving wet fallout.

8. An automatic rain gauge according to claim 1, wherein the wet fallout passes through a polytetrafluoroethylene covered circuit.

9. An automatic rain gauge according to claim 1, wherein said means for performing at least one physicochemical measurement on the first part of the wet fallout comprise temperature measuring means and conductivity measuring means.

10. An automatic rain gauge according to claim 1, wherein said means for performing at least one physicochemical measurement on the second part of the wet fallout comprise pH measuring means.

* * * * *